United States Patent [19]
Hodge et al.

[11] Patent Number: 5,744,945
[45] Date of Patent: Apr. 28, 1998

[54] CRYOGENIC FLUID-LEVEL SENSOR

[75] Inventors: James D. Hodge; Lori J. Klemptner, both of Lincolnwood, Ill.; Justin Whitney, Sandy, Utah

[73] Assignee: Illinois Superconductor Corporation, Mt. Prospect, Ill.

[21] Appl. No.: 336,275

[22] Filed: Nov. 8, 1994

Related U.S. Application Data

[62] Division of Ser. No. 984,060, Nov. 30, 1992, Pat. No. 5,393,736.

[51] Int. Cl.$^6$ .......................... G01N 27/00; H01L 39/16; G01F 23/24
[52] U.S. Cl. .......................... 324/71.6; 324/441; 324/629; 505/842; 73/304 R
[58] Field of Search .................... 324/71.6, 439, 324/441, 629, 693, 696, 697, 713, 715; 505/160, 842, 843; 73/290 R, 304 R

[56] References Cited

U.S. PATENT DOCUMENTS

| | | | |
|---|---|---|---|
| 3,267,730 | 8/1966 | Satterthwaite et al. | 505/842 X |
| 3,943,767 | 3/1976 | Efferson | 506/842 X |
| 4,566,323 | 1/1986 | Masumoto et al. | 505/842 X |
| 4,655,079 | 4/1987 | Masumoto et al. | 505/842 X |
| 4,745,806 | 5/1988 | Masumoto et al. | 73/304 R X |
| 5,114,907 | 5/1992 | Erwin et al. | 505/160 |
| 5,393,736 | 2/1995 | Hodge et al. | 505/160 |
| 5,552,371 | 9/1996 | Chen et al. | 505/160 |
| 5,593,949 | 1/1997 | Leung et al. | 505/160 |

*Primary Examiner*—Glenn W. Brown
*Attorney, Agent, or Firm*—Foley & Lardner

[57] ABSTRACT

A method of measuring a cryogenic fluid level utilizing a high temperature ceramic superconductor material driven above its level of critical current density. A high temperature ceramic superconductor is placed in cryogenic fluid and a voltage is applied between two points on the superconductor. The voltage drop is then measured at a third point on the superconductor. This voltage drop corresponds to the change in cryogenic fluid level, and thus can be used to measure the fluid level. Sensitivity of the measurement is increased by driving the high temperature ceramic superconductor above its level of critical current density.

7 Claims, 6 Drawing Sheets

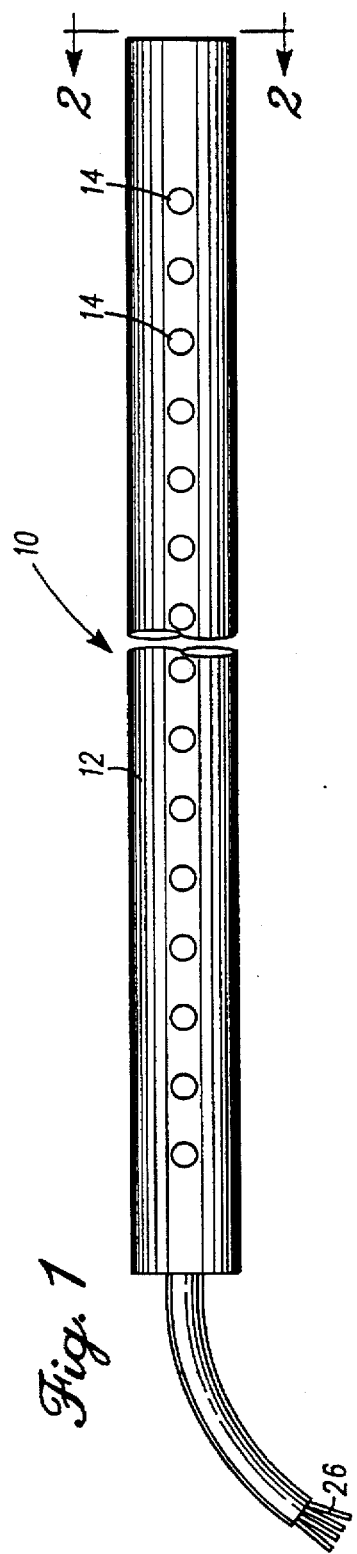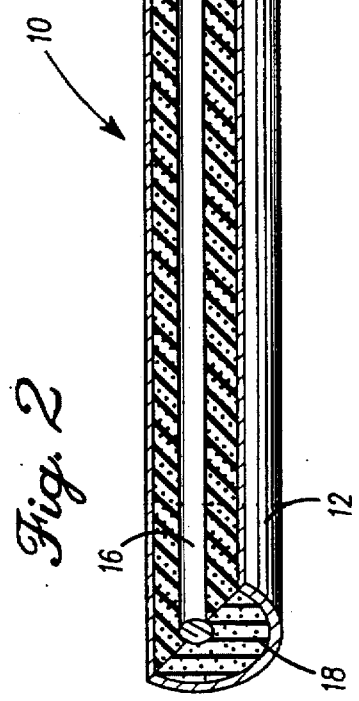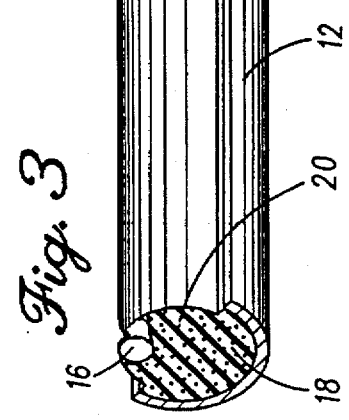

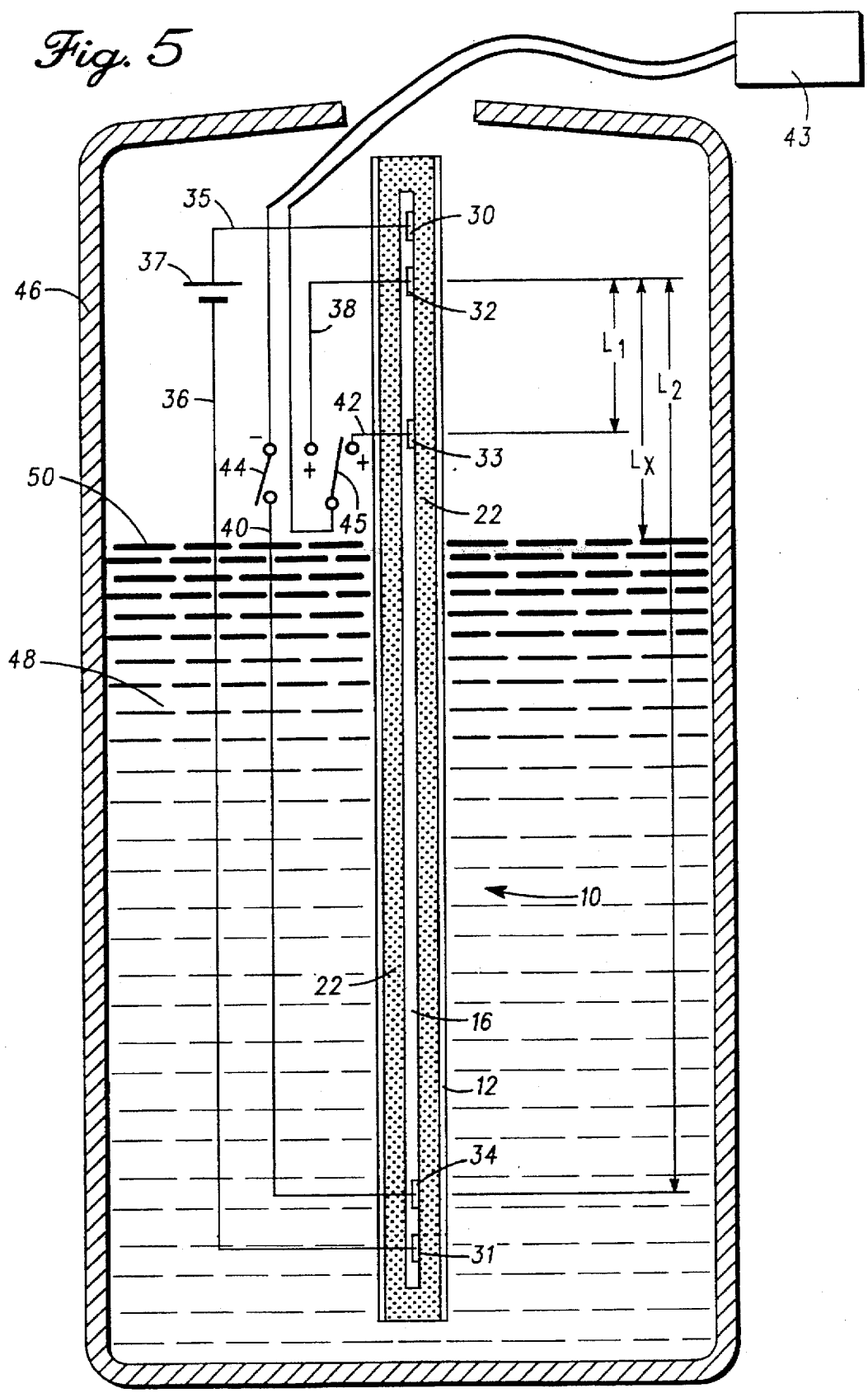

CRYOGENIC FLUID-LEVEL SENSOR

This is a division of application Ser. No. 07/984,060, filed Nov. 30, 1992, now issued as U.S. Pat. No. 5,393,736.

The present invention relates generally to an apparatus and method for determining fluid level in a container. More particularly, the invention relates to a novel apparatus and method for sensing cryogenic fluid levels in a container through the use of a specially processed high temperature ceramic superconducting material having a reduced level of critical current density.

Prior art cryogenic fluid level sensors generally operate using pressure sensors, thermocouple sensors or other point sensors, such as wound resistor elements in linear carbon resistors. These conventional sensors indicate a temperature change associated with the cryogenic fluid level dropping below the sensor location. While sensor devices using superconducting materials have been used for fluid level sensors, these generally utilize carefully controlled chemical composition gradients to indicate a change in temperature above and below the superconducting critical temperature. However, these sensor devices require preparation of precise compositional gradients, and are not generally adaptable for measurement ranges of cryogenic fluid depths. Further, many of these devices require additional components such as resistors to heat the sensor in the headspace in the dewar to compensate for headspace thermal effects (to prevent thaw/freeze cycles) leading to malfunction arising from ice formation or component cracking from thermal stress.

It is therefore an object of the invention to provide an improved apparatus and method for sensing the level of a cryogenic fluid in a container.

It is a further object of the invention to provide an improved apparatus and method for cryogenic fluid level sensing which provides increased sensitivity and reliability.

It is another object of the invention to provide an improved cryogenic fluid level sensor method and apparatus for operating in extremely cold environments without requiring additional heating components for the sensor assembly.

It is yet a further object of the invention to provide an improved method and apparatus for sensing cryogenic fluid levels utilizing a high temperature superconducting material.

It is still a further object of the invention to provide an improved method and apparatus for sensing cryogenic fluid levels utilizing a superconducting material with improved properties provided by specialized chemical doping techniques.

It is yet another object of the invention to provide an improved method and apparatus for sensing cryogenic fluid levels utilizing a superconducting material driven above a reduced level of critical current density to achieve Joule heating and increased measurement sensitivity.

Other advantages and details of the invention will become apparent from the following detailed description and claims and also in the drawings described hereinbelow.

BRIEF DESCRIPTION OF THE DRAWINGS

FIG. 1 shows a cryogenic fluid level sensor encased in a housing;

FIG. 2 illustrates a longitudinal perspective cross-sectional view taken along line 2—2 in FIG. 1 for a first embodiment of the ceramic superconductor sensor;

FIG. 3 shows a partially assembled ceramic superconductor sensor disposed in a foam mound;

FIG. 5 shows a ceramic superconductor and associated current/voltage sensor connections;

DETAILED DESCRIPTION OF THE PREFERRED EMBODIMENT

Figure 4:
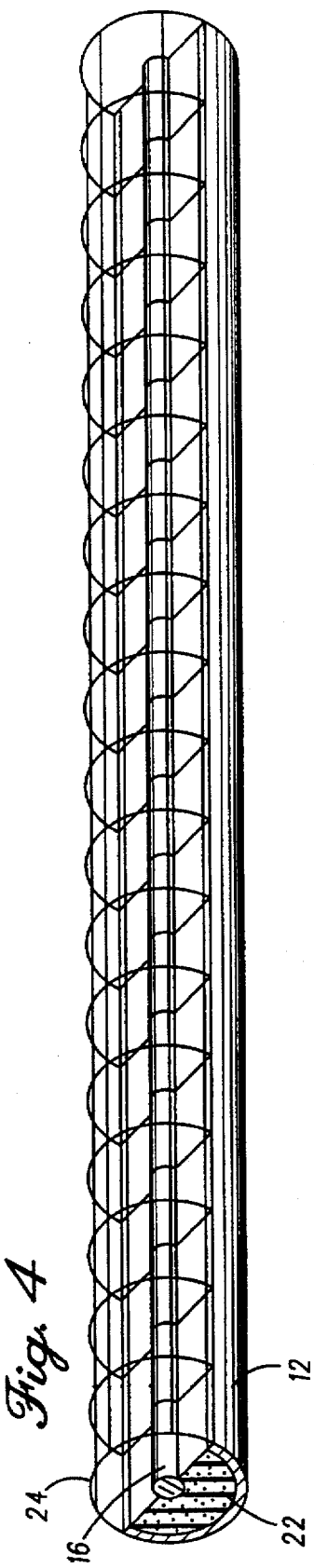
FIG. 4 illustrates a partially assembled ceramic superconductor sensor in a foam bed and overlying resilient mesh.

Referring now to the figures and more particularly to FIG. 1, a cryogenic fluid level sensor device constructed in accordance with the invention is indicated generally at 10. In FIG. 1 is shown a completely assembled form of the cryogenic level sensor 10 (hereinafter "sensor 10"), including an outer casing 12 with access port 14 through which the cryogenic fluid flows into contact with a superconducting rod 16 shown in FIG. 2. The superconducting rod 16 (hereinafter "rod 16") is a ceramic material having a high critical temperature, typically about 85° K for known ceramic superconductors, such as YBaCuO or BaSrLaCuO (see, for example, U.S. Pat. No. 4,943,559 which is incorporated by reference herein) in its entirety.

The rod 16 can be located on a support bed 18 with an adhesive holding the rod 16 firmly in place. A variation on this approach of FIG. 2 is a structure shown in FIG. 3, wherein the support bed 18 has an additional polyurethane foam mound 20 which receives the rod 16 within a channel in the mound 20.

In another embodiment shown in FIG. 4, the length of the rod 16 is more substantial, and the structure to accommodate the length is thus different. It is preferable for such a structure to position the rod 16 loosely on the foam bed 22, or in a recessed channel of the foam bed 22, with a resilient mesh material 24 stretched over the rod 16 and affixed to the sides of the foam bed 22. The resilient mesh material 24 (for example, nylon mesh or its equivalent) operates as a means for elastically retaining the rod 16 without breakage or positional shifting of the rod 16 during cycling of temperatures from the cryogenic fluid temperature range to room temperature.

Sensor 10 is shown in FIG. 5, and the outer casing 12 is partially removed for clarity in the drawing. The drawing also does not show the voltage/current exterior leads 26 which are shown in FIG. 1. The rod 16 is shown positioned in the foam bed 22, and electrical contacts 30, 31 and voltage contacts 32, 33 and 34 are attached to the rod 16. These contacts 30–34 can be established by using conventional means, such as conducting epoxies. Electrical current leads 35 and 36 allow application of electrical current from an electrical energy source, such as a battery 37. Electrical voltage leads 38, 40 and 42 are used to measure the voltage drop over selected portions of the rod 16. The voltage leads 38 and 42 are used with any one of a variety of conventional voltage measurement and analysis devices depicted as component 43. Switches 44 and 45 are operated to selectively measure the voltage drop along the rod 16 between the voltage contacts 32 and 34. The voltage leads are also used, in the same manner as the voltage leads 38 and 42, to measure, for selected associated portions, the voltage drop along the rod 16 between the voltage contacts 32 and 33.

Figure 6:
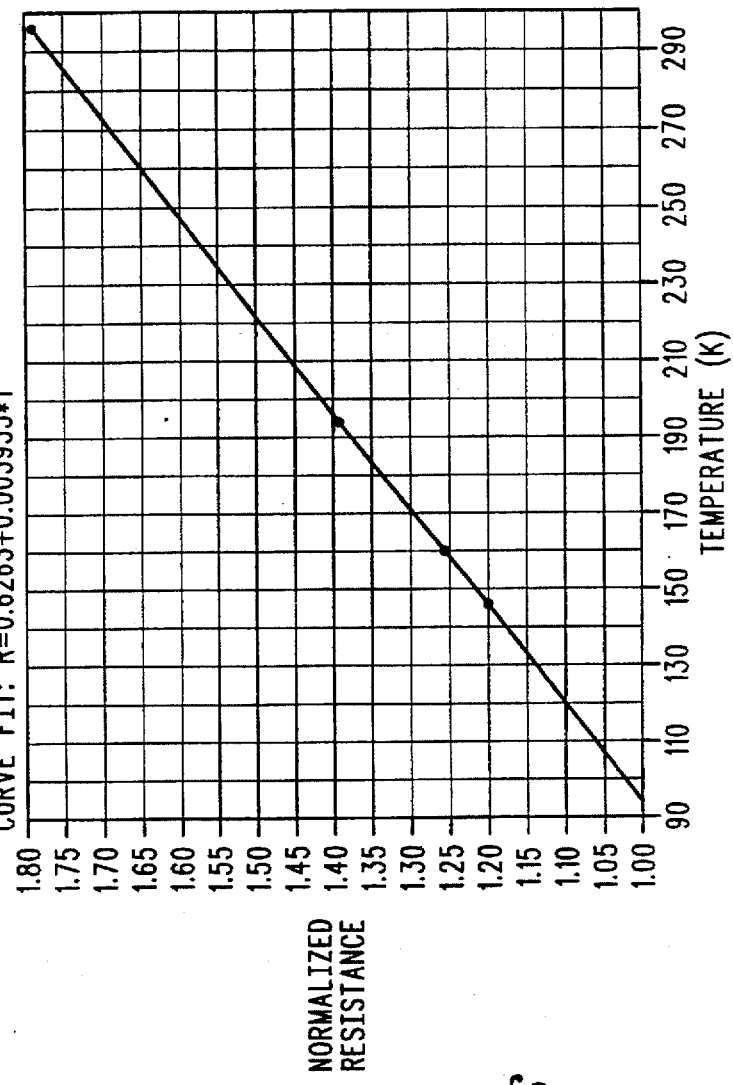
FIG. 6 illustrates a plot of cryogenic level sensor resistance versus temperature (°K) for a conventional ceramic superconductor.
Figure 7:
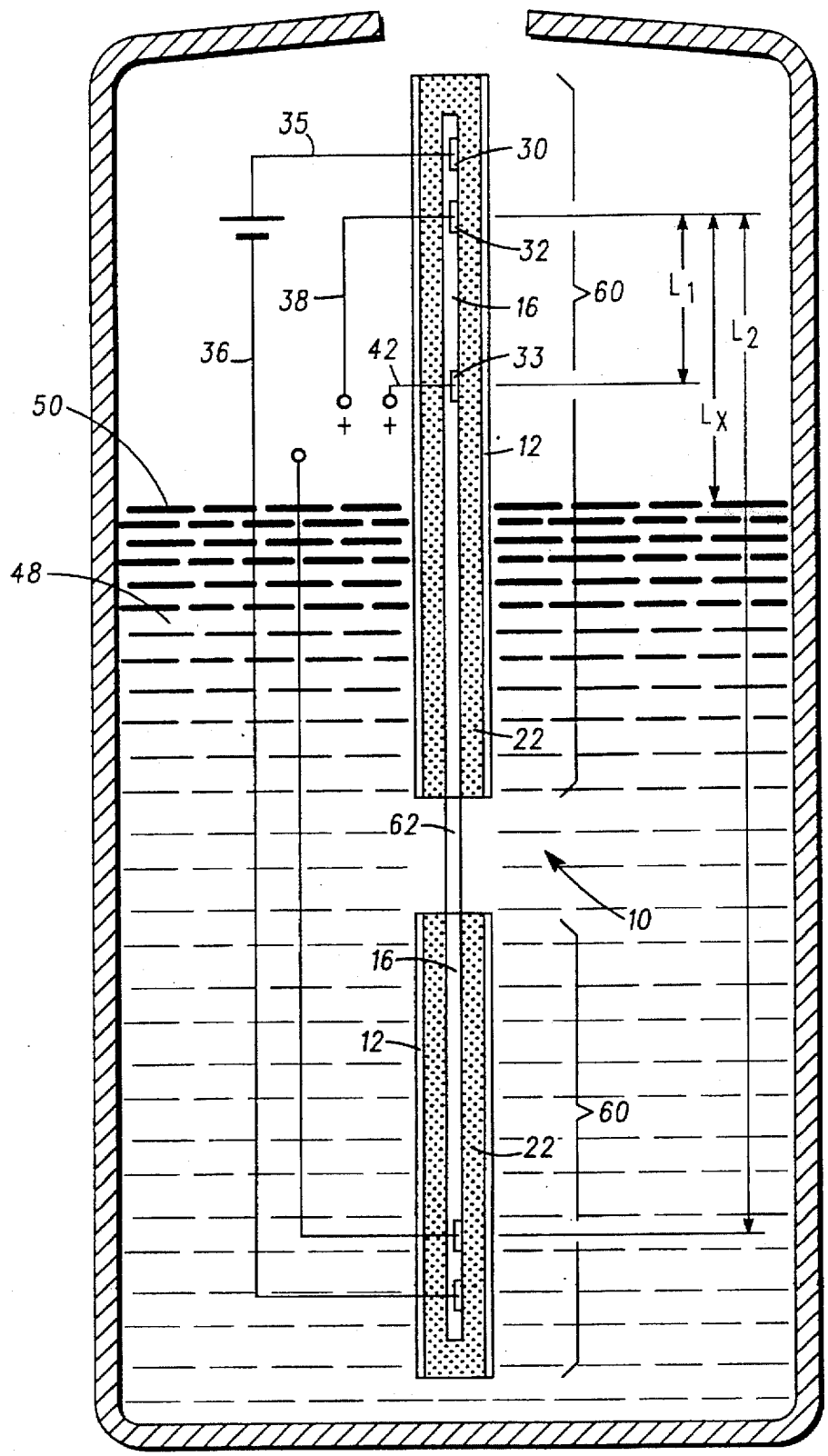
FIG. 7 illustrates a discontinuous, plural link of ceramic superconductor rods and associated current/voltage sensor connections.
Figure 8:
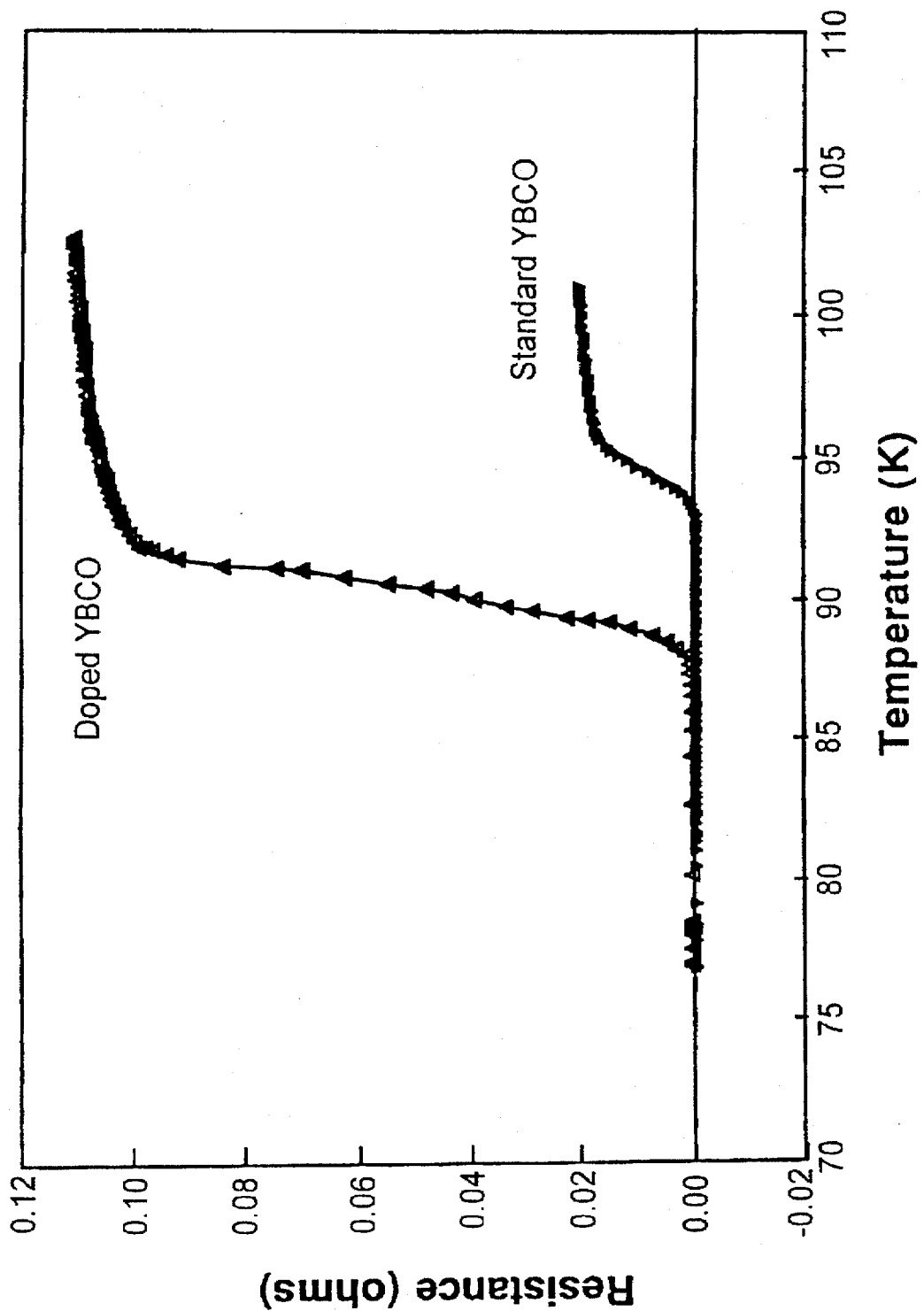
FIG. 8 illustrates a resistance versus temperature plot comparing doped and undoped $YBa_2Cu_3O_{7-x}$.
Figure 9:
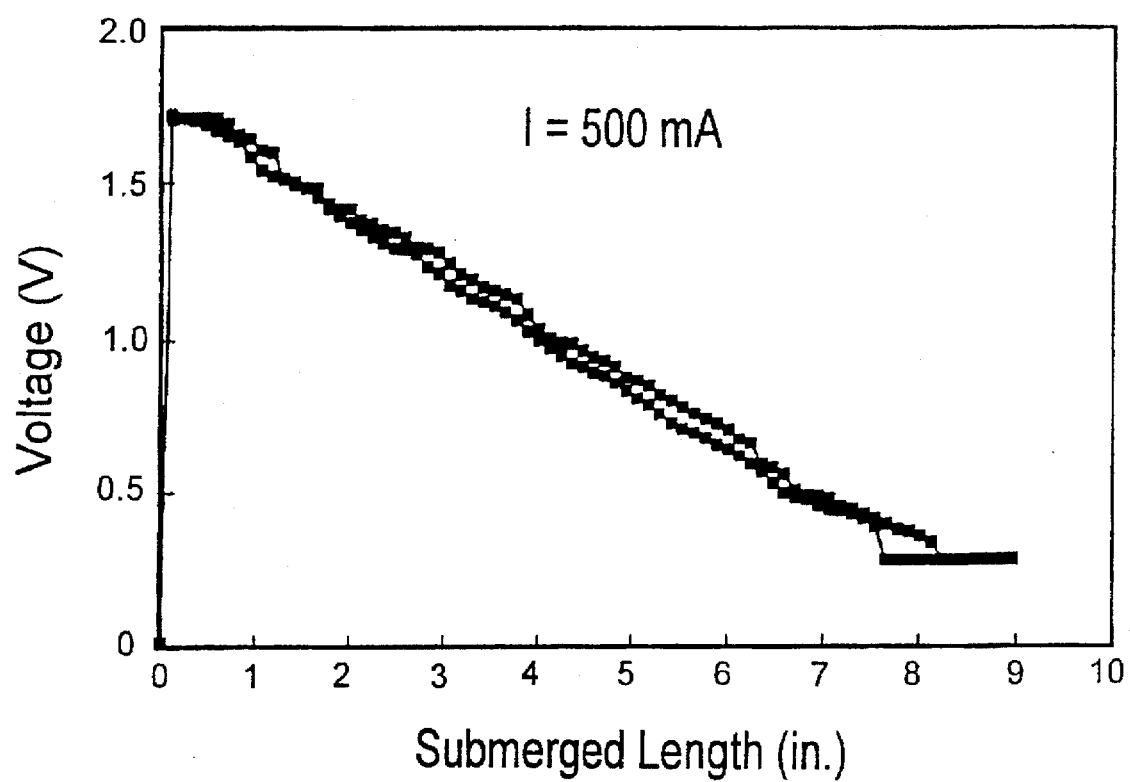
FIG. 9 shows the linear nature of the voltage output of the sensor device as a function of its submerged length.

The distance between the voltage contacts 32 and 33 is a precisely measured distance $L_1$, while the distance between the voltage contacts 32 and 34 need not be a precisely measured distance $L_2$. Because the rod 16 comprises a superconducting material, any part of the rod 16 which is in a superconducting state and which is driven below its reduced level of critical current density will have zero resistance. Conversely, any portion of the rod 16 which is not at a temperature below the superconducting critical temperature $T_C$ will exhibit conventional resistive behavior. When the rod 16 is driven above its reduced level of critical current density at temperatures above $T_c$, it exhibits relatively low resistive behavior. In the case of a ceramic superconductor having the composition $YBa_2Cu_3O_{7-x}$, the resistive behavior is a weak function of temperature above $T_C$ as shown in FIG. 6.

Consequently, using the sensor 10 one can readily measure the level of cryogenic fluid in which the sensor 10 is immersed. For example, as shown in FIG. 5, container 46 contains cryogenic fluid 48 with an upper level 50. Upper level 50 is positioned at a distance $L_x$ below the voltage contact 32. Because the portion of the rod 16 above the upper level 50 is above the critical temperature of the superconducting material, this portion of the rod exhibits a resistance which is a finite value characteristic of length $L_x$. For example, if the voltage drop for distance $L_1$ is one volt and the measured voltage drop $V_x$ between voltage contact 32 and 34 is 1.5 volts, we know that $L_x$ is 1.5 times $L_1$. This relationship is valid because the portion of the rod 16 immersed in the cryogenic fluid 48 has zero resistance since the superconducting material is maintained below its critical temperature.

Therefore, in order to measure the position of the upper level 50, only two voltage measurements and the length $L_1$ need be known. This voltage information can be used to measure the position of the upper level 50 relative to the voltage contacts 32 and 33. Further, the voltage information can also be used to activate or control selected devices, such as cryogenic fluid filling means, to add cryogenic fluid 48 to the container 46 when a voltage value $V_x$ reaches a preset value associated with a low fluid level.

Though various high temperature, ceramic superconducting materials with low levels of critical current density can be used, preferably $YBaSrCu_3O_{7-x}$ is used in the sensor 10. This product is preferably created by doping the $YBaCu_3O_{7-x}$ superconductor, such as with SrO or other dopants, causing reduction of the level of critical current density ("$J_c$") for the superconductor. After doping the superconductor, the strontium-doped composition is processed to produce a material with a low $J_c$, i.e., less than about 20 milliamperes.

In other forms of the invention, a reduced $J_c$ property characteristic for the high temperature superconductor can be achieved by other means. For example, a reduced $J_c$ can be obtained by heat treatment of polycrystalline material to produce large grained microstructures having defect features giving rise to scattering centers which reduce $J_c$. Such defects can include, e.g., strained grain boundaries or other point and line defects known to act as current scattering centers. In addition, microstructures can be produced having porosity which also reduce $J_c$. A variety of such structures, which are normally considered to be defective, detrimental structures can be utilized to produce the desired effect of a material with reduced $J_c$.

It has been determined that the superconductor with lowered $J_c$ can be used to take advantage of the properties arising from the reduced $J_c$ characteristics. The sensor 10 produced from the doping method responds with increased sensitivity when subjected to current levels substantially over its level of critical current density, $J_c$. Furthermore, this increased resistivity for the doped superconductor and specialized processing characteristics described below result in a material which is much less sensitive to the perturbing effects of temperature changes of the dewar headspace. Consequently, the voltage output of the sensor 10 is more linear and reproduceable and is able to operate effectively even in headspace temperatures that are below the critical temperature of the superconductor.

The doping of the base superconductor also lowers the critical temperature of the superconductor from 90° K (the normal critical temperature for undoped $YBa_2CuO_{7-x}$) to about 85° K. Accordingly, the actual transition temperature is brought closer to the temperature of the typical cryogen of interest, liquid nitrogen (boiling point of seventy seven degrees Kelvin). This lowering of $T_c$ makes the sensor 10 more sensitive to the position of the liquid/vapor interface 52. Secondly, a presence of the dopant, such as SrO, raises the normal state resistance of the superconductor substantially to approximately five times that of undoped material. Higher resistance results in a higher voltage output from the sensor 10 per unit length of the rod 16 not covered by the cryogen; this higher voltage output makes sensor 10 more sensitive to changes in the cryogenic fluid level. The higher normal state resistance of the doped-superconductor also produces a higher degree of Joule heating in the exposed portion of the rod 16, allowing it to function more effectively at a lower operating current in a cold headspace. The doping of the ceramic superconductor also reduces the temperature dependence of the normal state resistivity above the critical temperature. This reduced temperature dependence makes the device much less sensitive to dewar headspace temperature variations resulting in a linear response for the sensor 10 over a greater range of headspace temperatures and liquid levels. The following process which can be used to produce the rod 16 is described for illustrative, nonlimiting purposes:

1. Ball mixing amounts of yttrium oxide, copper oxide, barium carbonate, and strontium carbonate in either water, methanol, ethanol, isopropyl alcohol, xylene, toluene or other organic solvents.

2. Drying the resultant slurry at either room temperature or slightly elevated temperatures;

3. Calcining the loose precursor powder at about 850° C. for 15 hours in an atmosphere of 2 torr of oxygen;

4. Extruding the calcined powder into "green" unfired fibers;

5. Firing the extruded "green" fibers at 850°–890° C. for 3–10 hours in a partial pressure in the range of 2–760 torr (one atmosphere); and 6. Annealing the fired fibers in one atmosphere of oxygen at 350° to 450° C. for 12–36 hours. It should be noted that increasing the partial pressure of the oxygen necessitates a corresponding change in firing temperature. For example, if the fiber is fired in one atmosphere of oxygen, the temperature necessary to produce desirable product qualities increases to about 950° C. It should also be noted that calcining the loose precursor powder is an essential step. If the precursor powder is not calcined prior to the extruding and firing, a filament is produced has an unacceptably high level of critical current density of approximately 1–2 amperes, and the rod 16 is also mechanically weak.

In operation, the superconducting material contained in the rod 16 is driven with an operating current substantially above the level of critical current density of the superconductor. Because the preferred process produces material with a low level of critical current density, the operating currents needed are still below the upper levels desired by most users of superconductors for more typical electrical power applications. These desired current levels are typically around 500 milliamperes.

While using an operating current substantially above the level of critical current density of the superconductor would seem to nullify the basic principle of operation of the sensor 10, i.e., the sharp change in resistance that occurs at the material's critical temperature, this is not the case. A superconductor's level of critical current density is an electrical current level density at which electrical losses in the material reach a defined level established by industry practices. Thus, the level of the critical current density does not represent a step change in material's resistivity or conductive mechanism. Consequently, even at current levels that are several orders of magnitude over the superconductor's level of critical current density, the apparent resistance of the material is substantially lower than the extrapolated "normal" state resistance of the material. Further, when the rod 16 is operated above its level of critical current density, a sharp resistance change is still observed as the superconducting material is warmed through its critical temperature.

Operation of the rod 16 above the level of critical current density for the superconducting material can provide substantial advantages. First, such operation serves to provide a source of electrical loss and, consequently, Joule heating which enables the sensor 10 to operate in very cold headspaces. When the rod 16 is submerged, this Joule heating is insufficient to cause any significant heating of the cryogenic liquid. However, when the rod 16 becomes exposed to vapor in the headspace, this Joule heating is sufficient to cause the rod 16 to heat above its critical temperature and exhibit the "normal" resistance critical to the function of the sensor 10. Such normal resistance heating prevents accumulation of frozen vapor on the rod 16 which can lead to cracking of the rod 16 and/or thermal data anomalies arising from the presence of ice in the rod 16.

While preferred embodiments have been illustrated and described, it should be understood that changes and modifications can be made therein without departing from the invention in its broader aspects. Various features of the invention are defined in the following claims.

What is claimed is:

1. A method of using a cryogenic fluid level sensor assembly, comprising the steps of:

placing a length of high temperature ceramic superconductor material in contact with a cryogenic fluid;

operating said ceramic superconductor material above its level of critical current density;

providing an input voltage between a first location and a second location along said length of ceramic superconductor material; and measuring a voltage drop between a third location on said length of ceramic superconductor material and said second location, said voltage drop varying with the length of a cryogenic fluid column in contact with said ceramic superconductor material thereby providing an indication of a level of cryogenic fluid.

2. The method as defined in claim 1 wherein said ceramic superconductor material comprises $YBaSrCu_3O_{7-x}$.

3. The method as defined in claim 1 wherein said ceramic superconductor material has a reduced level of critical current density.

4. The method as defined in claim 3 wherein the reduced level of critical current density derives from doping said superconductor.

5. The method as defined in claim 3 wherein said reduced level of critical current density derives from a large grained microstructure in said superconductor.

6. The method as defined in claim 3 wherein said reduced level of critical current density derives from a micropore structure in said superconductor.

7. The method as defined in claim 3, wherein the reduced level of critical current density is less that ten milliamps.

* * * * *